United States Patent [19]
van Lintel

[11] Patent Number: 5,277,556
[45] Date of Patent: Jan. 11, 1994

[54] VALVE AND MICROPUMP INCORPORATING SAID VALVE

[75] Inventor: Harald T. G. van Lintel, Enschede, Netherlands

[73] Assignee: Westonbridge International Limited, Dublin, Ireland

[21] Appl. No.: 838,229

[22] PCT Filed: Jul. 3, 1991

[86] PCT No.: PCT/EP91/01240
 § 371 Date: Mar. 4, 1992
 § 102(e) Date: Mar. 4, 1992

[87] PCT Pub. No.: WO92/01160
 PCT Pub. Date: Jan. 23, 1992

[30] Foreign Application Priority Data
 Jul. 10, 1990 [CH] Switzerland ............ 02302/90
 Nov. 20, 1990 [CH] Switzerland ............ 03680/90

[51] Int. Cl.⁵ ..................................... F04B 17/00
[52] U.S. Cl. ........................ 417/413 A; 417/410 A; 137/855
[58] Field of Search ............ 417/322, 410, 413; 37/855, 859

[56] References Cited
FOREIGN PATENT DOCUMENTS
 0224189 6/1989 Switzerland .
 9015929 12/1990 World Int. Prop. O. .......... 417/322

OTHER PUBLICATIONS
Article entitled "A piezoelectric micropump based on micro-machining of silicon" *Sensors and Actuators*, vol. 15, #2, pp. 153–167.
International Search Report for PCT/EP91/01240.

*Primary Examiner*—Richard A. Bertsch
*Assistant Examiner*—Alfred Basichas
*Attorney, Agent, or Firm*—Pollock, Vande Sande & Priddy

[57] ABSTRACT

A valve is formed by machining a silicon wafer 18 bonded to a glass wafer 2. This machining forms a membrane 44 and a sealing ring. Part of the surface of the membrane 44 and optionally the sealing ring are oxidized in order to impart a mechanical pre-tension to the membrane holding the valve in a closed position. Further etching 52 may be carried out in a manner such that in the absence of the aforesaid pre-tension the valve is in the open position at rest.

20 Claims, 2 Drawing Sheets

VALVE AND MICROPUMP INCORPORATING SAID VALVE

TECHNICAL FIELD

The present invention relates to micropumps, and particularly to micropumps of the type in which at least a part of the mechanism of the pump is formed by machining a wafer using micromachining technologies such as photolithographic technology and in particular a valve for such a micropump.

BACKGROUND OF THE INVENTION

Pumps of this type can be used notably for the in situ administration of medicaments whereby miniaturisation of the pump enables the patient to wear it on his person or optionally to have a pump directly implanted in his body. In addition, using pumps of this type small quantities of liquid can be accurately administered.

In an article entitled "A piezoelectric micropump based on micromachining of silicon" published in "Sensors and Actuators" No. 15 (1988), pages 153 to 167, H. van Lintel et al. describe two embodiments of a micropump each comprising a stack of three wafers, i.e., a wafer of machined silicon arranged between two wafers of glass. Another embodiment of such a micropump is described in Swiss Patent Application No. 02 241/89-1 of Jun. 14, 1989.

In this article a silicon wafer defines a pump chamber with one of the glass wafers, it being possible for the part coinciding with this chamber to be deformed by a drive means, in the present case a piezoelectric crystal. The latter comprises electrodes which, when connected to an alternative voltage source, cause deformation of the crystal and thus of the glass wafer, the latter in turn causing variation in the volume of the pump chamber.

The pump chamber is connected on both sides to check valves in which a membrane and a sealing ring are machined from silicon and the seat of which is composed of the other glass wafer.

The construction of such a valve is carried out in two stages. In a first step, the silicon wafer is etched in order to form the membrane, part of the wafer being protected from the etching in order to form the sealing ring and in a second step a thin layer of oxide is formed on the sealing ring and optionally on part of the membrane. This gives to the membrane a certain mechanical pre-constraint or pre-tension whereby the seat of the valve is forced towards the sealing ring.

One of the disadvantages of this type of micropump is that the yields of such micropumps, which may seem to be identical, are not the same. This mainly results from the fact that even though it is relatively easy to control the depths of the etching of the silicon, it is more difficult to control the thickness of the membranes since the thickness of a wafer of silicon is not constant over the whole of its surface, but on the contrary shows certain variations. The thickness of the membranes governs the amount of the pre-tension and hence ultimately the parameters for the opening and closing of the valves. This is particularly important in the case of the outlet valve which requires a greater pre-tension.

SUMMARY OF THE INVENTION

It is an object of the invention to overcome this disadvantage. This object is achieved by a valve according to claim 1. Claim 7 also defines a valve according to the invention which reduces this disadvantage. Claim 8 defines a micropump equipped with at least one valve according to the invention.

The layer of other material may be realized on the membrane, so as to cover it for example by thermal oxidation, or in the membrane, for example by a heavy doping the membrane surface.

BRIEF DESCRIPTION OF THE DRAWINGS

The features and advantages of the invention are better illustrated by the following description given for purposes of example, but which is not limiting and with reference to the accompanying drawings in which.

DETAILED DESCRIPTION OF THE INVENTION

Figure 1:
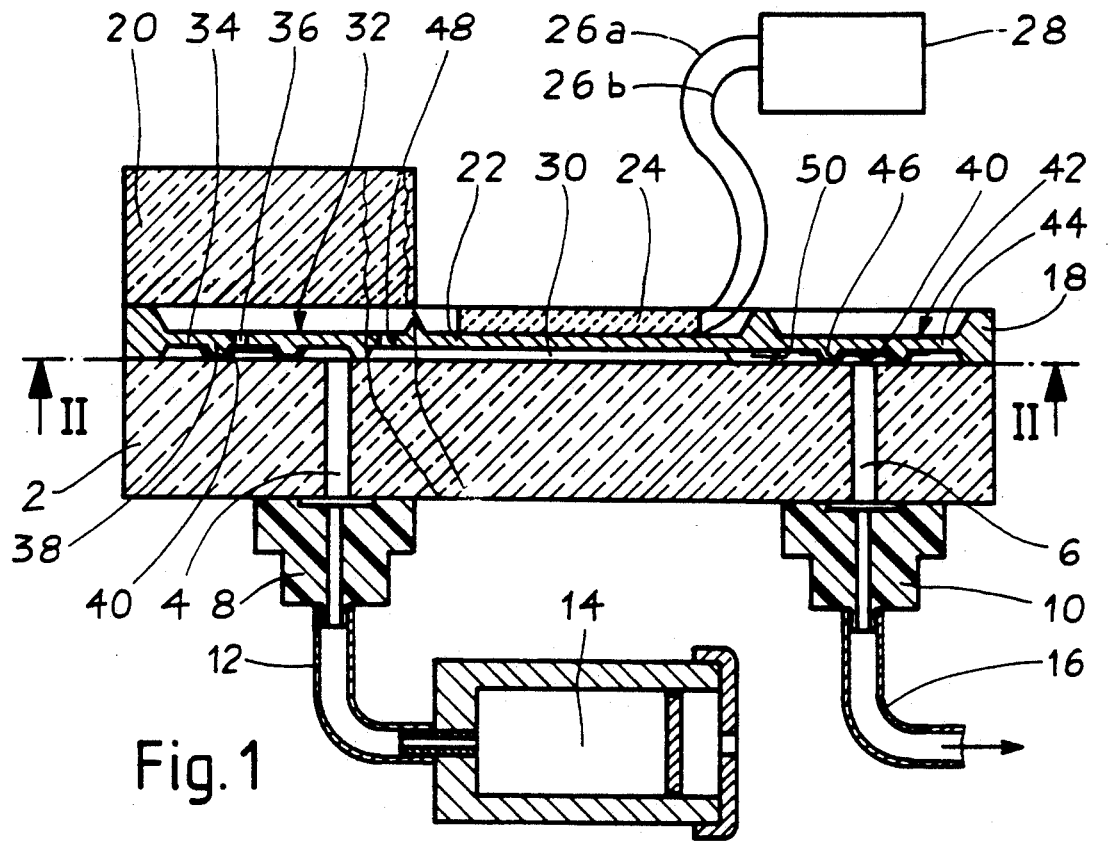
FIG. 1 shows a schematic cross-section of a micropump according to the invention.
Figure 2:
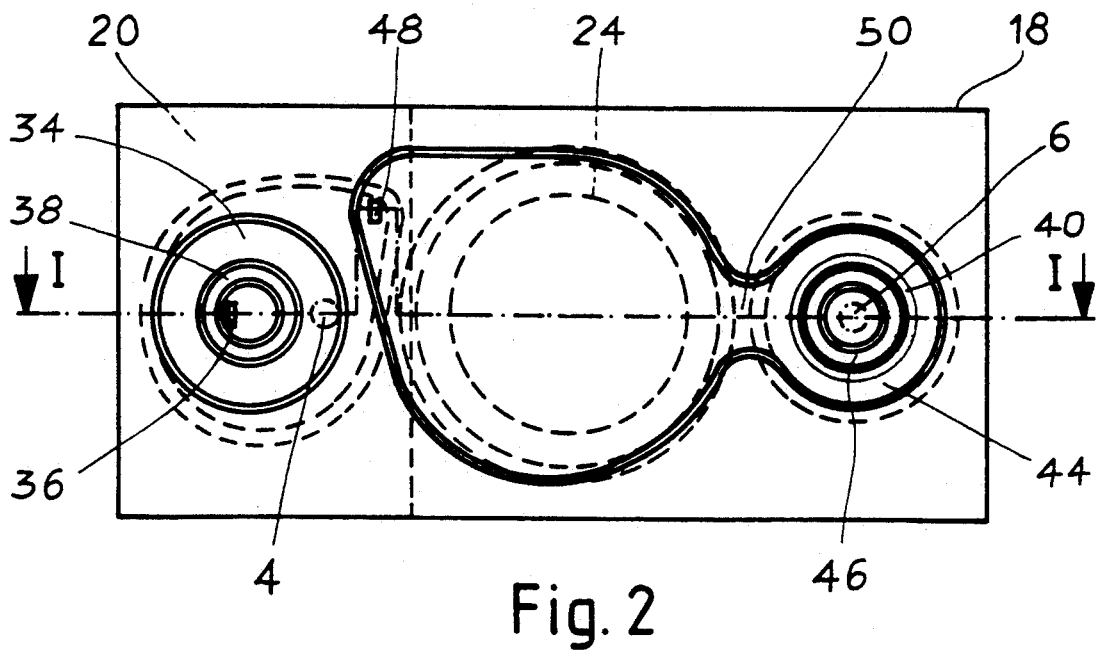
FIG. 2 shows a top view of the intermediate wafer of the micropump shown in FIG. 1, FIGS. 3A, 3B and 3C show a section of an embodiment of the valve according to the invention.

Reference is first made to FIGS. 1 and 2 which show a micropump having a valve according to the invention.

It should be noted that, for sake of clarity, the thicknesses of the various wafers forming the micropump have been greatly exaggerated in the drawings.

The micropump of FIGS. 1 and 2 comprises a base wafer 2 of, for example, glass which is pierced by two channels 4 and 6 forming the inlet and outlet channels respectively of the pump. These channels 4 and 6 are linked to the connections 8 and 10 respectively.

The connection 8 leads to a tube 12 which itself is joined to a reservoir 14 containing the liquid to be pumped. The reservoir is sealed with a pierced cap, a movable piston isolating the useful volume of the reservoir 14 from the exterior. This reservoir may contain a medicament, for example in the situation where the pump is to be used to inject a precise dosage of this medicament into the human body. In this case, the micropump may be carried on the patient's body or may be implanted.

The outlet connection of the exit 10 may be connected to an injection needle (not shown) with which it may be connected by a tube 16.

The use in this manner of the micropump of the invention is particularly suitable for treating certain forms of cancer with peptides, where medication is preferably given in a precise dosage and the doses are repeated at regular intervals in small amounts. Another possible application is for the treatment of diabetics who need to receive regular, small doses of medicament in the course of the day, it being possible for example to determine the dosage by means known per se, measuring the blood sugar level and automatically controlling the pump so that a suitable dose of insulin can be injected.

The wafer 18 of silicon or other material capable of being machined using photolithographic technology is bonded to the glass wafer 2. Above this silicon wafer is a glass closure wafer 20. A membrane 22 is formed in the wafer 18 the thickness of which is such that it may be deformed by a control element 24 which, in the embodiment of the invention described herein, is a piezoelectric disk provided with electrodes 26a and 26b connected to an alternating current generator 28. This disk may be that manufactured by Philips under the reference number PXE-52 and may be bonded to the wafer 18 using a suitable adhesive.

For purposes of example the intermediate silicon wafer 18 can have a <100> crystal orientation so as to render it suitable for etching and to give it the required strength. The wafers 2 and 20 are preferably well polished.

The wafers 2 and 18 taken together firstly define a pump chamber 30 of substantially circular form situated below the membrane 22.

Between the inlet channel 4 and the pump chamber 30, there is a first valve 32, which is a check-valve, machined into the silicon wafer 18. This valve comprises a membrane 34 of generally circular form with near its centre an orifice forming the passage 36, which in the embodiment herein shown, is of rectangular shape. The valve 32 also comprises an annular rib or sealing ring 38 of more or less trapezoidal section. This sealing ring surrounds the orifice 36 and is covered with a thin oxide layer 40 which is obtained by photolithographic technology as well. This imparts to the membrane 34 a certain pre-tension when the sealing ring 38 is pressed against the glass wafer 2, this latter thereby serving as the seat of the valve 32.

The outlet channel 6 of the pump communicates with the pump chamber 30 through a valve 42 which is similar in construction to that of the valve 32. In this case, however, for example by the formation of an oxide layer on part of the membrane and/or by using a different thickness of the layer 40 as compared with that on the valve 32, the pre-tension imparted by this oxide layer 40 may be different to that used for the valve 32. The valve 42 thus comprises a membrane 44 and a sealing ring 46 covered with an oxide layer 40. Furthermore, as is shown in FIG. 1, this membrane is not provided with any central orifice such as the orifice 36 of the valve 32.

It may be noted that the pump chamber 30 communicates with the valve 32 and with the valve 42 respectively by way of an orifice 48 and a passage 50, both of which are machined into the silicon wafer 18.

By way of specific example, the thicknesses of the wafers 2, 18 and 20 may for example be of the order of 0.6 mm, 0.3 mm and 0.6 mm respectively and the surface of the pump may be of the order of 10 by 20 mm. Furthermore, the wafers may be fixed one to the other by various conventional techniques, such as by bonding or, for example, by a specific technique known as anodic bonding.

The valve 42 has a pre-tension tending to press the sealing ring against the valve seat in the absence of any external influence. This pre-tension depends on the thickness of the oxide layer, on the thickness of the membrane and on the thickness of the sealing ring.

By way of example, the process of forming the outlet valve will now be described with reference to FIGS. 3A-3C. The same procedure may be used for the formation of the inlet valve. In each case, the pre-tension required for the inlet valve is less than that for the outlet valve. Usually one does not form an oxide layer on the membrane of the inlet valve.

The outlet valve may thus be manufactured in accordance with the invention as follows. The silicon wafer 18 is etched on at least one of its surfaces, for example in a solution of KOH, in order to form the membrane 44. During this procedure a part of the wafer is protected from the etching process in order to form the sealing ring 46 (FIG. 3A).

A further etching 52 is then carried out in such a manner that, in the absence of an oxide layer and without any external influence, the sealing ring does not make contact with the valve seat. This further etching may be carried out on the silicon wafer 18 before or after the first etching. It may also be carried out on the part of the glass wafer forming the valve seat.

An oxide layer 40 is then formed on part of the membrane by thermal oxidation. This oxide layer induces shearing forces in the membrane which induce curvature therein (FIG. 3B), the oxide layer being on the convex side of the membrane. The thickness of the oxide layer is chosen in such a manner that when the glass wafer 2 is in contact with the silicon wafer 18, the sealing ring 46 is pressed against this glass wafer in the absence of any other influencing exterior force (FIG. 3C). For example for a further etching of 3 $\mu$m, an oxide layer of approximately 1.5 $\mu$m is formed. Part of this oxide layer may be left as is shown in FIG. 3B on the front surface of the membrane, that is to say the side having the sealing ring. It may also be decided to leave oxide on the reverse face instead of on the front surface. However, in order that the membrane may be curved in the same direction the oxide should then be left on the periphery of the membrane in the form of a ring.

It is of course quite clear that a material other than silicon oxide may be used in order to induce this curvature. However, this constitutes the most simple solution in that it suffices to thermally oxidize the wafer. The layer of material inducing a mechanical strain could be provided in the membrane, rather than on the membrane. This could be obtained, for example, by a heavy doping of part of the membrane surface via techniques such as boron diffusion.

The oxide layer or any other layer of another suitable material may advantageously be used to cover the sealing ring 46 (FIG. 3B) and to thereby form a protecting layer in order to prevent adhesion of the sealing ring to the glass wafer.

This protecting layer increases the effective thickness of the sealing ring and thus modifies the pre-tension exerted on it when assembled. It should be understood that, in the absence of the oxide on the membrane, no pre-tension is caused by the sealing ring when its thickness (termed the nominal thickness) is such that the surface of the sealing ring is flush with the valve seat in the absence of any exterior influence. Such a situation is shown in FIG. 3A before the further etching 52 has been carried out.

When the effective thickness of the sealing ring is greater than its nominal thickness, for example if an oxide layer covers the sealing ring, this will apply a certain pre-tension against the valve seat. The degree of this pre-tension depends notably on the difference between the effective thickness of the sealing ring with respect to the nominal thickness and the elasticity, that is to say the thickness, of the membrane. This pre-tension corresponds to the third power of membrane thickness. It is added to the pre-tension which is caused by the layer of oxide which covers the membrane and which also depends on the membrane thickness, but there only to the first power. In this conventional case, a too thick membrane will cause an increase in both the pre-tension due to the oxide on the sealing ring, and in the pre-tension due to the oxide on the membrane. The variation of the overall pre-tension is the sum of both pre-tension variations.

The pre-tension caused by the oxide on the sealing ring can play an important role in this variation, due to the third order relation.

It would be of advantage to reduce this third order contribution, or even to use it in a beneficial way.

Consider first oxide on the sealing ring only. When the effective thickness of the sealing ring is less than its nominal thickness, for example if there has been etching of the sealing ring, and the oxide layer on the sealing ring is less thick than the depth of this etching, the sealing ring will not come in contact with the valve seat. In the same way as with the preceding case, it is clear that now the sealing ring gap creates a negative pre-tension whose absolute value is equal to the pressure which would have to be exerted on the membrane for the sealing ring to be flush with the valve seat. If in this case an oxide layer is also formed on the membrane, the pre-tension to which the valve is subjected will be equal to the pre-tension caused by the curvature of the membrane diminished by this negative pre-tension.

As explained, membrane thickness variations cause pre-tension variations. In the situation according to the invention, the variation in membrane oxide pre-tension, is approximately compensated by the variation in negative sealing ring gap pre-tension.

If the dimensions are chosen well, the overall pre-tension remains substantially constant for a certain range of membrane thicknesses.

Simulations have shown that micropumps equipped with an outlet valve according to the invention show substantially the same pre-tension and thus nearly the same behaviour despite differences of $\pm 2.5$ $\mu m$ in the membrane thickness of the valves having a mean thickness of 25 $\mu m$ (depth of the further etching approximatively 3 $\mu m$; oxide layer approximatively 1.5 $\mu m$ thick).

Figure 4:
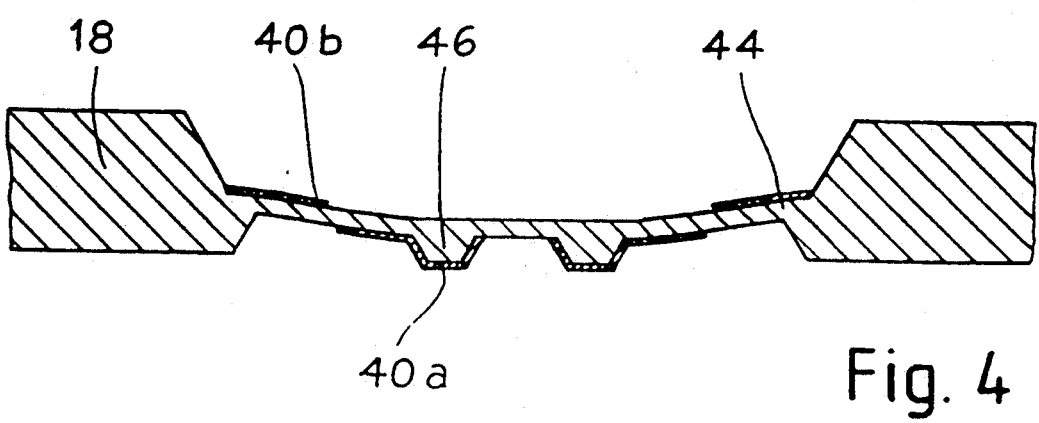
FIG. 4 shows a section of a further valve according to the invention.

The oxidation of the wafer 18 in order to form the oxide layer 40 is a relatively long stage since the thickness of the oxide layer increases with the square root of the oxidation time. It is possible to cut the time of this operation by a factor of four. In order to do this, it is merely necessary as is shown in FIG. 4 to oxidize both faces of the membrane. Thus if one forms oxide layers 40a and 40b having a thickness of 0.5 $\mu m$ for example, such that the layer 40b covers the surface that is not covered by the layer 40a on the other side, one obtains a pre-tension about equal to that caused by an oxide layer 40 formed on a single face of the membrane having a thickness of 1 $\mu m$. If oxide layers 40a and 40b overlap, the overlapping parts of these layers have opposite effects which therefore cancel out one another.

Figure 3A:
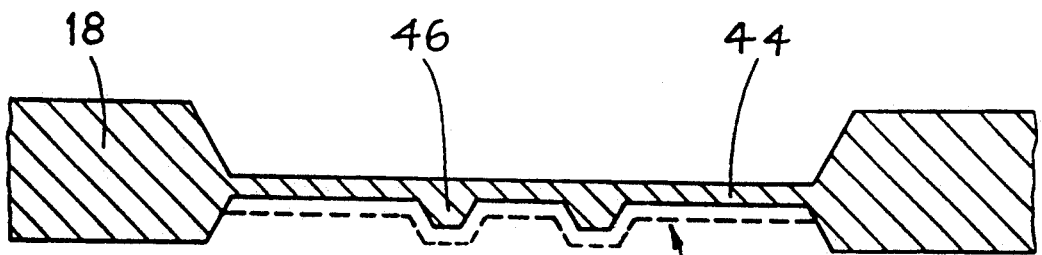
Figure 3B:
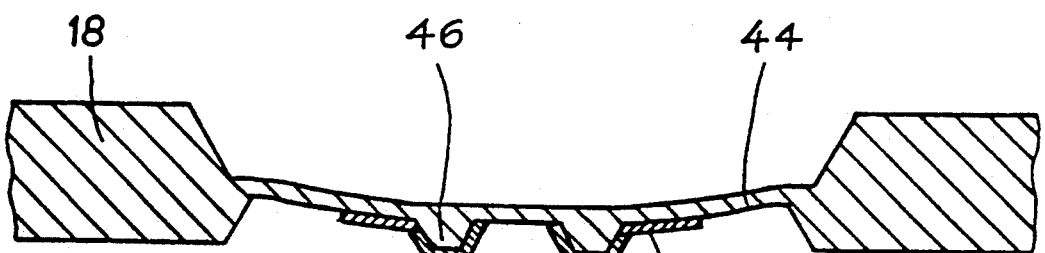
Figure 3C:
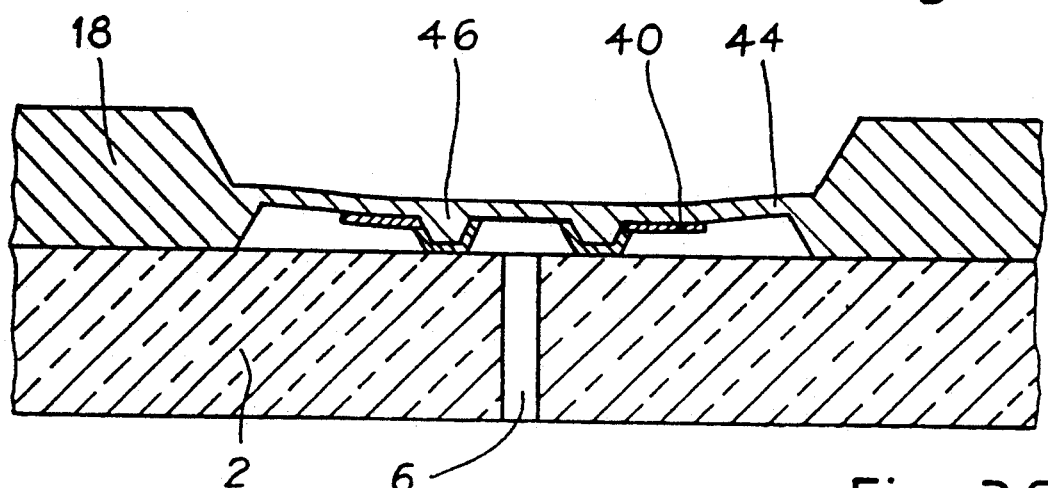

It may in addition be stated that even without having recourse to further etching as shown in FIG. 3A the oxidation of both faces of the membrane gives a better reproducibility to the characteristics of the micropump. This is caused by the fact that one increases the effective sealing ring thickness to a lesser extent than in the case where one only oxidizes the sealing ring's side of the membrane. This reduces the unwanted pre-tension caused by oxide on the ring, while one slightly increases the pre-tension caused by oxide on the membrane.

It may also be emphasized that in case of oxidation of the two sides of the membrane one can easily adjust the pre-tension to the desired value by selecting suitable values for the radii of the oxide layers. However, often a maximum bending efficiency will be advantageous to allow thin membranes for little flow resistance.

What is claimed is:

1. A valve comprising a first wafer in which a deformable membrane is made of a first material, and a second wafer bonded to the first wafer, a sealing ring being provided on the face of one of the wafers and having a free surface capable of contacting the face of the other wafer in a closed position and of being spaced apart therefrom in a valve open position according to the position of the deformable membrane, a portion of the membrane distinct from said sealing ring being partially provided with at least one layer of a second material of sufficient thickness to induce a mechanical strain keeping the valve in the closed position in the absence of an external influence, and at least one of the wafers being so machined that, if the layer or layers of said second material had been omitted, said valve would be in the open position in the absence of the external influence.

2. A valve according to claim 1, wherein the sealing ring is formed by machining the membrane of the first wafer.

3. A valve according to claim 2, wherein each face of the membrane is partially provided with a layer of said second material.

4. A valve according to claim 2, wherein the first wafer is a silicon wafer and said second material is silicon oxide.

5. A valve according to claim 2, wherein the sealing ring is covered by a layer of a third material which prevents adhesion of the free surface of the sealing ring to the face of the other wafer.

6. A valve according to claim 5, wherein said third material is identical to said second material.

7. A valve according to claim 1, wherein each face of the membrane is partially provided with a layer of said other second material.

8. A valve according to claim 7, wherein the first wafer is a silicon wafer and said second material is silicon oxide.

9. A valve according to claim 7, wherein the sealing ring is covered by a layer of a third material which prevents adhesion of the free surface of the sealing ring to the face of the other wafer.

10. A valve according to claim 9, wherein said third material is identical to said second material.

11. A valve according to claim 1, wherein the first wafer is a silicon wafer and the other material is silicon oxide.

12. A valve according to claim 11, wherein the sealing ring is covered by a layer of a third material which prevents adhesion of the free surface of the sealing ring to the face of the other wafer.

13. A valve according to claim 12, wherein said third material is identical to said second material.

14. A valve according to claim 1, wherein the sealing ring is covered by a layer of a third material which prevents adhesion of the free surface of the sealing ring to the face of the other wafer.

15. A valve according to claim 14, wherein said third material is identical to said other material.

16. A micropump comprising at least two valves, a first wafer having a deformable membrane made of a first material, at least a second wafer bonded face to face with the first wafer to define a pump chamber which can selectively communicate by one of said valves with at least one inlet of the micropump and which can selectively communicate by the other of said valves with at least one outlet of the micropump, and means for inducing a periodic variation in the volume of said pump chamber, at least one of said valves comprising a sealing ring provided on the face of one of the wafers and having a free surface capable of contacting the face of the other wafer in a valve closed position and of being spaced apart therefrom in a valve open position according to the position of the deformable membrane, a portion of the membrane distinct from said sealing ring being partially provided with at least one layer of a second material of sufficient thickness to induce a mechanical strain keeping the valve in the closed position in the absence of an external influence, and at least one of the wafers being so machined that, if the layer or layers of said second material had been omitted, said valves would be in the open position in the absence of the external influence.

17. A micropump according to claim 16, wherein the sealing ring is formed by machining the membrane of the first wafer.

18. A micropump according to claim 16, wherein each face of the membrane is partially provided with a layer of said second material.

19. A micropump according to claim 16, wherein the free surface of the sealing ring is covered by a layer of a third material in order to prevent adhesion of the sealing ring to the face of the opposite wafer.

20. A valve comprising a first wafer having a membrane of a deformable first material, and a second wafer bonded to the first wafer, a sealing ring being also provided on a face of one wafer and having a free surface capable of contacting the face of one wafer and having a free surface capable of contacting the face of the other wafer in a valve closed position and of being spaced apart therefrom in a valve open position according to the position of the deformable membrane, each face of the membrane being partially provided with at least one layer of a second material inducing a mechanical strain to keep the valve in the closed position in the absence of an external influence.

* * * * *

UNITED STATES PATENT AND TRADEMARK OFFICE
CERTIFICATE OF CORRECTION

PATENT NO. : 5,277,556
DATED : January 11, 1994
INVENTOR(S) : HARALD T. G. VAN LINTEL It is certified that error appears in the above-identified patent and that said Letters Patent is hereby corrected as shown below:

Column 6, line 35, delete "other"; and
lines 46 and 59, change "other" to --second--.

Column 7, line 16, change "valves" to --valve--.

Column 8, line 11, delete "a free surface", and delete line 12.

Signed and Sealed this

Thirty-first Day of May, 1994

Attest:

BRUCE LEHMAN

Attesting Officer     Commissioner of Patents and Trademarks